March 22, 1949. S. L. DE LISA 2,464,852
FAUCET
Filed Aug. 23, 1946 2 Sheets-Sheet 1

Inventor.
Samuel L. De Lisa.
by H. J. Sanders
Attorney.

March 22, 1949.    S. L. DE LISA    2,464,852
FAUCET
Filed Aug. 23, 1946    2 Sheets-Sheet 2
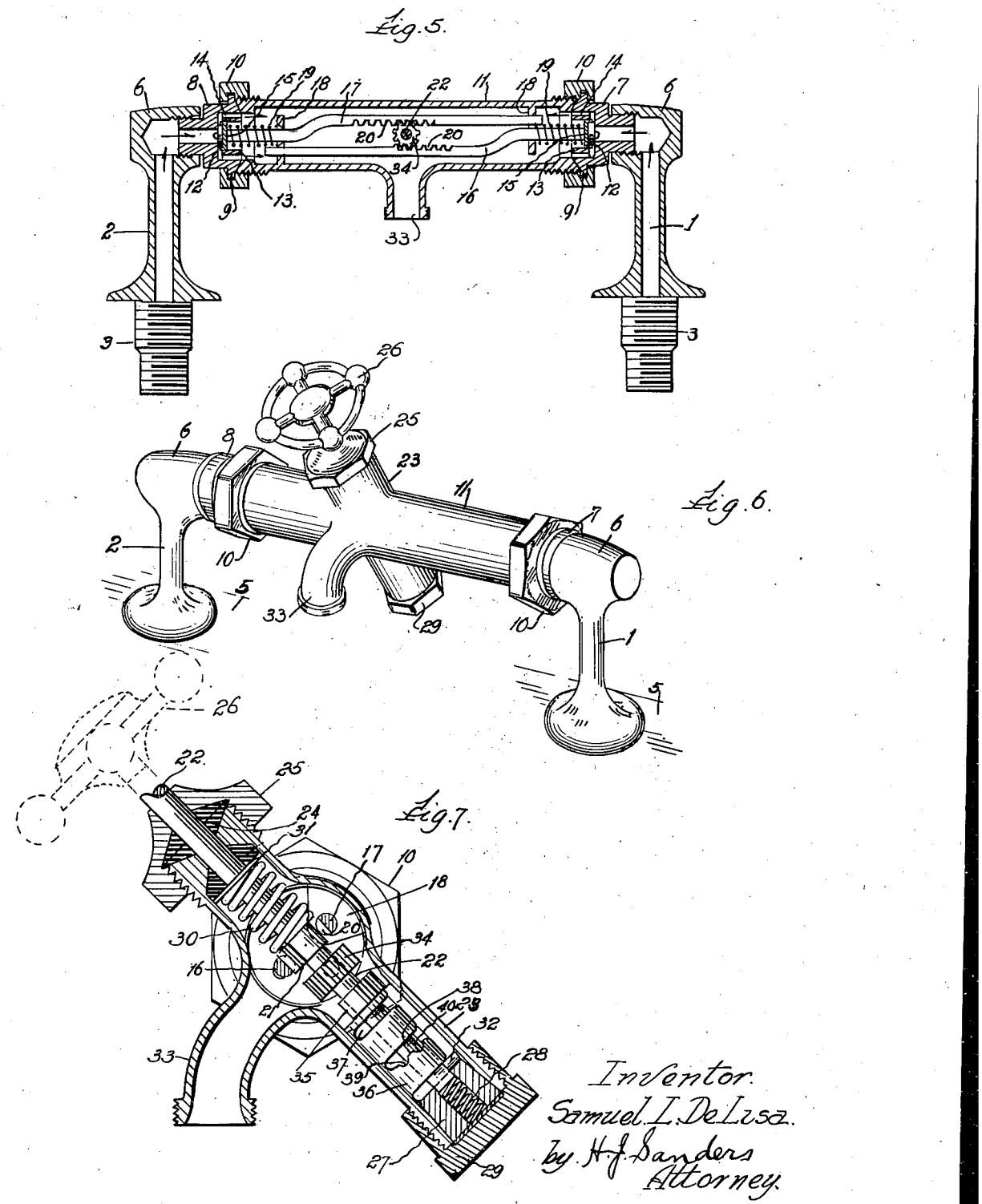
Inventor.
Samuel L. De Lisa.
by H. J. Sanders
Attorney.

Patented Mar. 22, 1949

2,464,852

UNITED STATES PATENT OFFICE 2,464,852

FAUCET

Samuel L. De Lisa, Chicago, Ill.

Application August 23, 1946, Serial No. 692,436

3 Claims. (Cl. 277—18)

This invention relates to improvements in faucets and more particularly to combination water faucets for use in bath rooms, kitchen sinks and the like. One object is to provide a faucet wherein moderately hot water may be provided at all times, water at a temperature not hot enough to cause accidental scalding when the faucet is turned on by children or by others in a more or less thoughtless manner. In many instances accidents have resulted from turning a faucet on full force while the water was at high temperature causing burning or scalding of the hands, arms or other parts of the body. This would have been prevented through the use of the instant faucet.

In the present structure the faucet is yieldingly retained in neutral position under spring tension and only cold water is supplied unless the control is manually moved from normal cold water position before the faucet is opened. An object of the invention is to provide a faucet of this type that may be substituted for the conventional combination faucet or, of course, installed initially.

A further object of the invention is to provide a faucet whereby water of substantially any predetermined or desired temperature may be readily supplied. Another object is to provide a faucet of this type that is positive and efficient in operation, durable in use, simple in construction and of few parts, attractive in appearance and inexpensive to manufacture.

Other objects, novel features and advantages of arrangement construction and design comprehended by the invention are hereinafter more fully pointed out or made apparent from the following description of a preferred embodiment as illustrated in the accompanying drawings wherein like reference characters denote corresponding parts throughout.

In the drawings:

Fig. 5 is a longitudinal vertical central sectional view through the mixing chamber and inlet stems therefor.

Fig. 6 is a view in perspective of the faucet shown in Fig. 3.

Fig. 7 is an enlarged longitudinal sectional view through the faucet outlet and associated parts, and, Fig. 8 is a longitudinal sectional view through a slightly modified form of mixing chamber.

Figure 1:
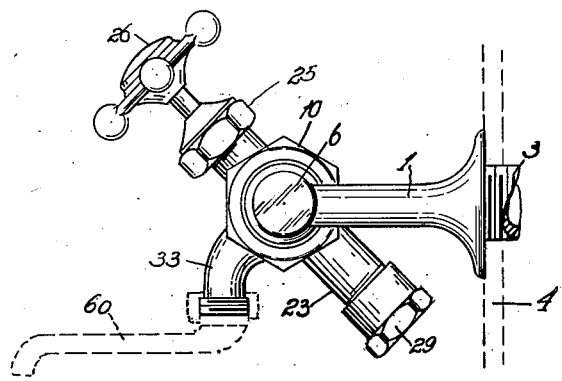
Fig. 1 is a view of the instant faucet in end elevation illustrating its application, an auxiliary outlet being denoted in dotted lines.
Figure 2:
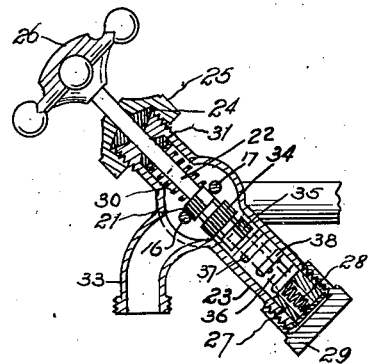
Fig. 2 is a longitudinal central sectional view through the faucet on the line 2—2 of Fig. 3 but with the faucet in an altered position.
Figure 3:
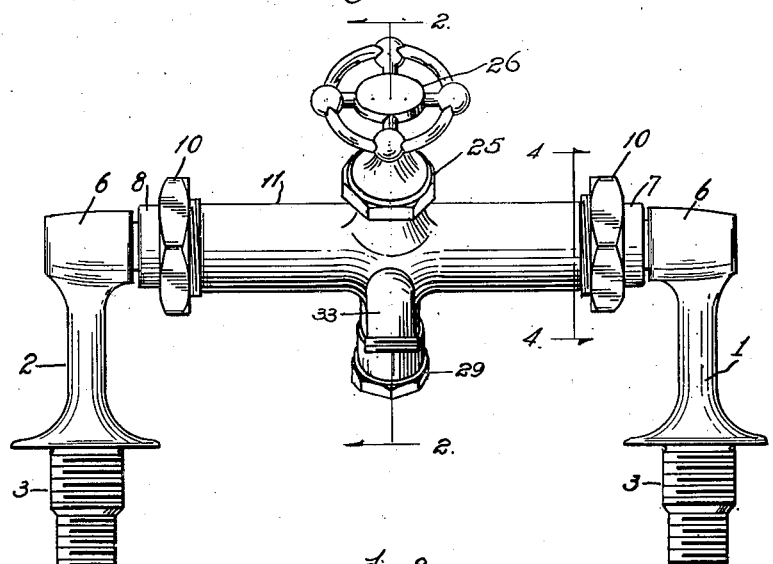
Fig. 3 is a view of the faucet in front elevation.
Figure 4:
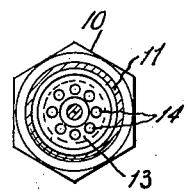
Fig. 4 is a cross sectional view on the line 4—4 of Fig. 3.
Figure 8:
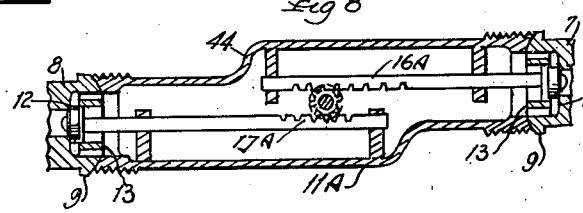

The reference numeral 1 denotes a cold water inlet stem and 2 a hot water stem each having an exteriorly threaded stem portion 3 for application to a vertical or horizontal support 4 or 5. Each stem includes an integral interiorly threaded hollow head 6, said heads releasably receiving the threaded shanks of the coupling nuts 7, 8 each formed exteriorly with a terminal flange 9 connected by nut 10 to the exteriorly threaded terminals of the tubular mixing chamber 11, or of the modified form of mixing chamber 11A as shown in Fig. 8. The said stems 1, 2, nuts 7, 8 and mixing chamber 11 are disposed in axial alignment with each other.

The said coupling nuts 7, 8 are formed with valve seats 12 and spaced slightly therefrom with sockets 13 opening inwardly and each formed with a plurality of spaced perforations 14 arranged in a circle providing, in connection with the space between said socket and seat, a liquid passageway leading from head 6 into the mixing chamber, said passageways being yieldingly closed by valves 15 normally disposed upon seats 12, the valve stems being the reduced ends of the angular racks 16, 17 extending longitudinally of said mixing chamber and operatively supported for movement longitudinally thereof by guide brackets 18.

The said guide brackets 18 extend inwardly from the wall of said mixing chamber and are arranged at opposite ends thereof. The base of each socket 13 has its outer face undercut to snugly but adjustably receive the said valve 15. Received upon each rack 16 and 17 between bracket 18 and the base of socket 13 is an expansion coil spring 19, said springs having ends connected to said racks and brackets and serving yieldingly to retain said racks in predetermined positions closing the said valves 15. The said racks are arranged parallel to each other and their adjacent surfaces formed with opposed serrations 20 adapted to mesh with a pinion 34 fast upon control shaft 22, said pinion being of a diameter to permit operative engagement of said racks jointly to move same in opposite directions. The said control shaft is of a rotary and plunger type and is operatively supported in the tubular jacket 23 integral with mixing chamber 11 disposed at right angles thereto and extending materially therebeyond in opposite directions.

The said shaft 22 extends axially of said jacket, through a packing 24 in the upper end thereof and through the nut 25 upon the upper end of said jacket and is provided exterior thereto with the hand wheel 26. The lower end of said jacket extends into an hollow abutment 27 within said jacket 23 at the lower end thereof and terminates upon a spring 28 within said abutment, said jacket being there provided with a cap nut 29.

Arranged upon shaft 22 within the jacket is an expansion coil spring 30 abutting a gasket 31 separating said spring and the innermost packing 24, said spring also abutting pinion segment 21 and yieldingly retaining said shaft in its innermost position within jacket 23 with a pin 32 fast to said shaft at its inner end in engagement with abutment 27 and said pinion segment 21 in mesh with rack 16. In this position of the parts the valves 15 are seated and the water passageways, hot and cold, closed thereby.

By now partially rotating hand wheel 26 in one direction the pinion segment 21 will move rack 16 to admit cold water into the mixing chamber and out through the discharge faucet 33 without effect upon the hot water control valve. Faucet 33 may be provided, if desired, with an extension 60. Fast upon shaft 22 spaced from pinion segment 21 is the pinion 34 and fast upon said shaft a like distance from pinion 34 is a pinion segment 35; pinion segment 21 operatively engaging rack 16 to admit cold water in the extreme inner position of shaft 22, pinion 34 operatively engaging both racks in the intermediate position of said shaft to admit both hot and cold water to the mixing chamber, and pinion segment 35 engaging rack 17 in the outermost position of said shaft with the hand wheel open. Rising from the inner face of the lower portion of jacket 23 is the bracket 36 disposed close to shaft 22 and formed with parallel slots 37, 38 extending from the free top edge of said bracket substantially to the base thereof, the lower end of said bracket being spaced from the abutment 27 a distance slightly greater than the diameter of pin 32 into which space said pin may be received when pinion segment 21 is in engagement with its rack, slot 38 being spaced from said bracket end a distance substantially equal to that between the parallel center lines of said pinion segment and pinion 34 and slot 37 spaced from slot 38 a distance corresponding to that between the center lines of pinion 34 and pinion segment 35.

One wall of slot 38 is formed with spaced notches 39, 40 to releasably receive pin 32 when desired. When in said slot the relative proportions of hot and cold water admitted to the mixing chamber may be varied by moving said pin from one notch to the other. With the pin in slot 37 water at the maximum temperature is admitted to the mixing chamber. A plunger movement of the shaft 22 is necessary to change rack engagements by the pinion or pinion segments, spring 28 serving as a shock absorber to cushion a sudden inward movement of shaft 22.

By loosening the nuts 10 the mixing chamber with jacket 23 may be adjusted in a rotary manner if desired. The teeth of pinion segments 21 and 35 are disposed upon relatively opposite sides of shaft 22 so that they engage and actuate different racks. In Fig. 8 the mixing chamber 11A is shown with an offset 44 to permit the racks 16A, 17A to be made straight instead of angular as in Fig. 5.

What is claimed is:

1. In a faucet, a mixing chamber having an outlet, intake stems, coupling nuts connecting said mixing chamber and intake stems, valves in said coupling nuts, racks in said mixing chambers operatively engaging said valves, means within said mixing chamber engaging said racks yieldingly retaining same in predetermined positions, a jacket carried by said mixing chamber opening thereinto, a rotary plunger shaft in said jacket extending beyond one end thereof, a hand wheel upon said shaft, a pinion fast upon said shaft, and pinion segments upon said shaft upon opposite sides of said pinion, said pinion and pinion segments adapted for selective engagement with said racks through the medium of said shaft.

2. In a faucet, a mixing chamber having an outlet, intake stems, coupling nuts connecting said mixing chamber and intake stems, valves in said coupling nuts, spaced parallel racks in said mixing chamber operatively engaging said valves, springs engaging said racks for retaining same yieldingly in predetermined positions, a jacket carried by said mixing chamber opening thereinto, a rotary plunger shaft in said jacket extending outwardly through one end thereof, a hand wheel upon said shaft, a pinion fast upon said shaft, pinion segments upon said shaft, said pinion and pinion segments adapted for engagement selectively with said racks as said shaft is actuated, a pin at one end of said shaft, and a bracket in said jacket in spaced relation to said shaft formed with slots spaced apart to receive said pin.

3. In a faucet, a mixing chamber having an outlet, intake stems, coupling nuts connecting said mixing chamber and intake stems, valves in said coupling nuts, spaced parallel racks in said mixing chamber operatively engaging said valves, springs engaging said racks, a jacket carried by said mixing chamber opening thereinto, a rotary plunger shaft in said jacket extending outwardly therefrom, a hand wheel upon said shaft, a pinion fast upon said shaft, pinion segments upon said shaft upon opposite sides of said pinion, a spring upon said shaft connecting said jacket and one pinion segment, said pinion and pinion segments adapted for engagement selectively with said racks as said shaft is actuated, a pin at one end of said shaft, and a bracket in said jacket spaced from said shaft formed with slots to receive said pin, said slots being spaced apart to correspond to the spacing between said pinion and pinion segments.

SAMUEL L. DE LISA.

REFERENCES CITED

The following references are of record in the file of this patent:

UNITED STATES PATENTS

| Number | Name | Date |
|---|---|---|
| 993,806 | Taylor | May 30, 1911 |
| 1,068,125 | Haller | July 22, 1913 |
| 1,402,632 | Meier | Jan. 3, 1922 |
| 1,641,560 | Whidden | Sept. 6, 1927 |
| 1,641,561 | Whidden | Sept. 6, 1927 |